United States Patent
Gardner

(10) Patent No.: US 7,272,832 B2
(45) Date of Patent: Sep. 18, 2007

(54) METHOD OF PROTECTING USER PROCESS DATA IN A SECURE PLATFORM INACCESSIBLE TO THE OPERATING SYSTEM AND OTHER TASKS ON TOP OF THE SECURE PLATFORM

(75) Inventor: Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 10/033,102

(22) Filed: Oct. 25, 2001

(65) Prior Publication Data

US 2003/0101322 A1    May 29, 2003

(51) Int. Cl.
G06F 9/46    (2006.01)

(52) U.S. Cl. .................. 718/105; 713/187; 713/191; 713/193

(58) Field of Classification Search ............ 718/100, 718/102, 104; 709/225–229, 103; 713/182, 713/200, 187, 191, 193
See application file for complete search history.

(56) References Cited

U.S. PATENT DOCUMENTS

| | | | |
|---|---|---|---|
| 4,809,160 A | 2/1989 | Mahon et al. | |
| 5,134,701 A | 7/1992 | Mueller et al. | |
| 5,450,586 A | 9/1995 | Kuzara et al. | |
| 5,465,335 A | 11/1995 | Anderson | |
| 5,757,919 A * | 5/1998 | Herbert et al. | 713/187 |
| 5,778,070 A * | 7/1998 | Mattison | 713/191 |
| 5,915,114 A | 6/1999 | McKee et al. | |
| 6,286,102 B1 * | 9/2001 | Cromer et al. | 713/200 |
| 6,289,462 B1 * | 9/2001 | McNabb et al. | 713/201 |
| 6,654,909 B1 * | 11/2003 | Quach et al. | 714/30 |
| 6,938,164 B1 * | 8/2005 | England et al. | 713/193 |
| 2001/0056533 A1 * | 12/2001 | Yianilos et al. | 713/201 |

OTHER PUBLICATIONS

Hewlett-Packard Product Manual, Overview of IA-64 Architecture.
Hewlett-Packard Product Manual, "IA-64 Software Conventions and Runtime Architecture", Version 1.0, Aug. 31, 1999.

(Continued)

Primary Examiner—Chun Cao
Assistant Examiner—Sean Weinman

(57) ABSTRACT

A computer system includes at least one processor and a memory. A secure platform is stored in the memory for controlling the processor and the memory. An operating system image is stored in the memory for controlling the processor and the memory, and operates on top of the secure platform. An end user application is stored in the memory for controlling the processor and the memory, and operates on top of the operating system image. The secure platform is configured to provide a secure partition within the memory for storing secret data associated with and accessible by the end user application. The secure partition is inaccessible to the operating system and other tasks operating on top of the secure platform.

6 Claims, 6 Drawing Sheets

OTHER PUBLICATIONS

Intel Product Manual, "Intel IA-64 Architecture Software Developer's Manual", vol. 1: IA-64 Application Architecture, Revision 1:1, Jul. 2000.

Intel Product Manuel, "Intel IA-64 Architecture Software Developer's Manual", vol. 2: IA-64 System Architecture, Revision 1.1, Jul. 2000.

Intel Product Manuel, "Intel IA-64 Architecture Software Developer's Manual", vol. 3: IA-64 System Architecture, Revision 1.1, Jul. 2000.

Intel Product Manuel, "Intel IA-64 Architecture Software Developer's Manual", vol. 4: IA-64 System Architecture, Revision 1.1, Jul. 2000.

Intel Product Manuel, "Intel IA-64 Architecture Software Developer's Manual", Itanium Processor Microarchitecture Reference for Software Optimization, Aug. 2000.

* cited by examiner

METHOD OF PROTECTING USER PROCESS DATA IN A SECURE PLATFORM INACCESSIBLE TO THE OPERATING SYSTEM AND OTHER TASKS ON TOP OF THE SECURE PLATFORM

THE FIELD OF THE INVENTION

The present invention relates to secure and trustworthy computer systems, and more particularly to protection of user process data in a secure platform architecture.

BACKGROUND OF THE INVENTION

Computer systems include at least one processor and memory. The memory stores application program instructions, data, and an operating system. The operating system controls the processor and the memory for system operations and for executing the application program instructions. Processors often have a current privilege level which controls the application instruction execution in the computer system at certain points in time by controlling accessibility to system resources, such as system registers, system instructions, and system memory pages. The current privilege level varies between two or more execution privilege levels.

Most processors have only two execution privilege levels. The Intel Architecture (IA-64) and the HP Precision Architecture (PA-RISC) type processors, however, specify four execution privilege levels.

A classical architecture for operating systems is a two-layer structure where user applications operate at a user privilege level. The user privilege level prevents the user applications from directly employing privileged instructions provided by the processor hardware. In the classical architecture, user applications employ a non-privileged instruction set provided by the processor hardware and an application program interface (API) defined by the operating system. In the classical architecture, operating system software primarily runs at a system privilege level. The system privilege level permits the operating system to utilize both the privileged and the non-privileged instructions provided by the processor hardware.

The classical two-layer architecture for operating systems has proven to be insufficient for the levels of reliability, availability, and security desired by trustworthy e-commerce servers and other trustworthy computer system applications. In the classical architecture, far too many components share full system privilege. The components sharing full system privilege are not sufficiently isolated and protected from one another. The volume of source code for the components sharing full system privilege is so large in modern operating systems that it is typically impossible by code walk-throughs and testing to ensure the correctness of the source code and that the behavior of the source code is benign. Essentially, there is no defense for a malicious component running with system privilege. The classical architecture for operating systems offers far too many avenues for obtaining system privilege. Thus, even though strong cryptographic techniques are currently available, contemporary attacks rarely, if ever, focus on cryptoanalysis. Since existing ciphers are very difficult to break, attackers typically probe and exploit system weaknesses.

The classical architecture also provides no protection for user process data. In the classical architecture with just two distinct privilege levels, a system administrator (or root user) has access to any secret information of other users. In the classical architecture, there is almost nothing that can be done to prevent this access. There are several simple ways for a root user to gain access to data in the address space of another process. A root user can use the "ptrace( )" system call to peek at another user's memory, or cause code to be executed as if the other user requested the execution. A root user can also use "/dev/kmem" to look at other users' information. A root user can also simply install a driver operating at system privilege level to peer into another user's memory space. Or, a root user can simply "impersonate" another user by writing code into that user's address space, which the user may later unknowingly execute.

For reasons stated above and for other reasons presented in greater detail in the Description of the Preferred Embodiments section of the present specification, there is a need for a fundamental change in operating system architecture design from the classical architecture for operating systems. It would be desirable for such a new secure operating system architecture to provide protection of secret user process data, and to prevent unauthorized access to such data, including unauthorized access by other users and a system administrator (or root user).

SUMMARY OF THE INVENTION

One aspect of the present invention provides a computer system including at least one processor and a memory. A secure platform is stored in the memory for controlling the processor and the memory. An operating system image is stored in the memory for controlling the processor and the memory, and operates on top of the secure platform. An end user application is stored in the memory for controlling the processor and the memory, and operates on top of the operating system image. The secure platform is configured to provide a secure partition within the memory for storing secret data associated with and accessible by the end user application. The secure partition is inaccessible to the operating system and other tasks operating on top of the secure platform.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Secure Platform Overview

Figure 1:
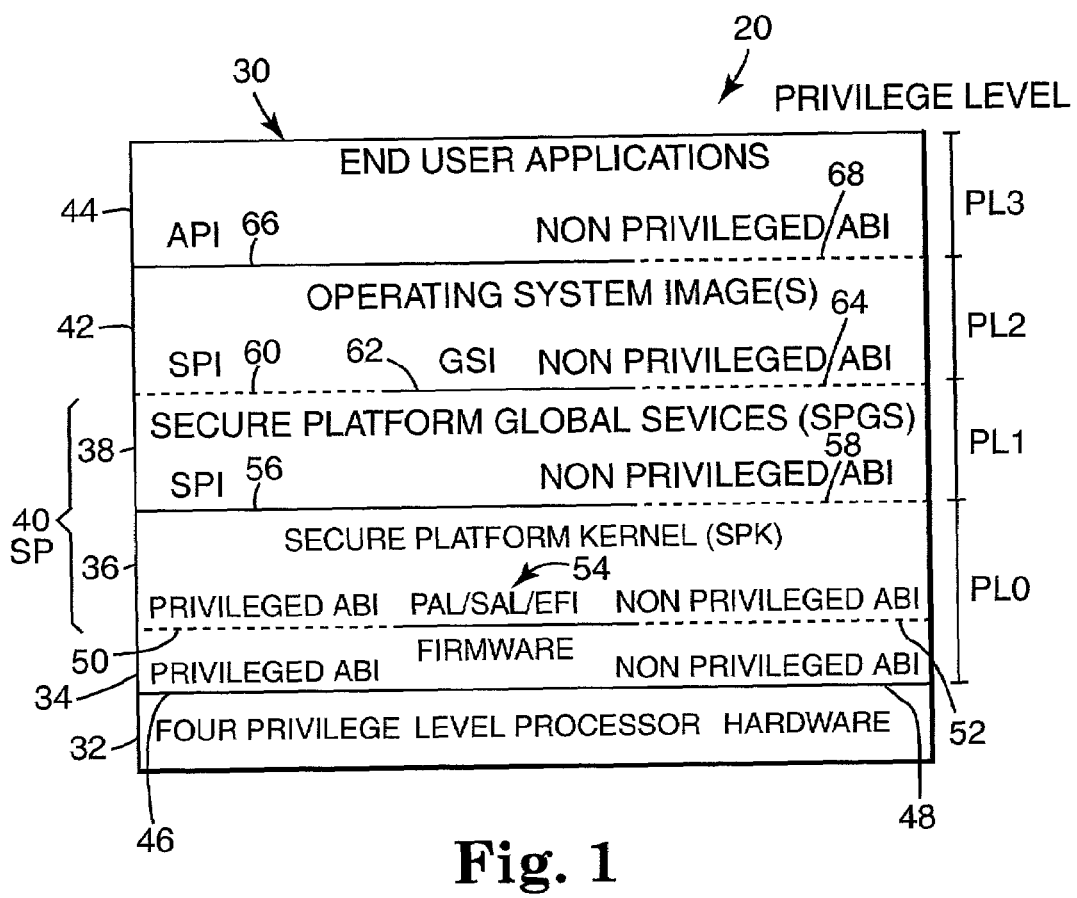
FIG. 1 is a block diagram of one embodiment of a secure platform (SP) computer system according to the present invention having a secure platform architecture (SPA) running on top of processor hardware having four execution privilege levels.

A secure platform (SP) computer system according to one embodiment of the present invention is illustrated generally at 20 in diagram form in FIG. 1. SP computer system 20 includes a secure platform architecture (SPA) 30, which runs on top of processor hardware having at least one processor 32 having four execution privilege levels. Example suitable types of processors 32 include the PA-RISC processor and the IA-64 processor. For clarity, the below discussion of the SPA 30 according to one embodiment of the present invention is typically specific to the IA-64 processor and the security capabilities designed into the IA-64 instruction set architecture (ISA), but other suitable four privilege level processors, such as the PA-RISC processor, having suitable security capabilities can be employed. SPA 30 allows for a set of trusted services that combine to enable implementation of a secure operating system.

SPA 30 includes firmware 34, which runs from processor hardware 32 at execution privilege level 0 (PL0), the most privileged level of processor 32. SPA 30 includes a four-layer ring of software, which runs on top of firmware 34 and processor hardware 32. The innermost ring is referred to as a secure platform kernel (SPK) 36 and is the only ring that runs as a privileged task. Thus, SPK 36 runs at PL0 and forms the foundation layer of SPA 30. A secure platform global services (SPGS) 38 runs on top of the SPK 36 as an unprivileged task. SPGS runs at execution privilege level 1 (PL1), the second most privileged level of processor 32. SPK 36 and SPGS 38 are collectively referred to as secure platform (SP) 40.

At least one operating system image 42 runs on top of SPGS 38 as an unprivileged task. Operating system image 42 runs at execution privilege level 2 (PL2), the third most privileged level of processor 32. End user applications 44 run on top of operating system image(s) 42 as unprivileged tasks. End user applications 44 run at execution privilege level 3 (PL3), the fourth most privileged level (i.e., the least privileged level) of processor 32.

Even though PL1 is referred to herein as the second most privileged level, PL2 is referred to as the third most privileged level, and PL3 is referred to as the fourth most privileged level, privileged instructions cannot be directly executed at these three levels in one form of the invention. In one embodiment, privileged instructions can be directly executed only at PL0.

As will be discussed in further detail below, a differentiating factor between the various privilege levels is memory page access. In one embodiment, each page of memory has a privilege level associated with it, and only that privilege level and those numerically lower have access to that page. For example, if a memory page is protected "PL2," then that memory page can be accessed by PL2, PL1, and PL0, but not by PL3. If a memory page is protected "PL3," then that memory page can be accessed at all levels.

SPK 36 is preferably a small kernel of trusted, provably correct code that performs all security critical services. Example security critical services include memory and process management, trap and interrupt handling, and cryptographic services. SPGS 38 is constructed with trusted code, but utilizes hardware security capabilities of the processors 32, such as IA-64 processors, to minimize the impact of a failure.

The interfaces between the software ring layers illustrated in FIG. 1 have dashed lines designating an interface that shows through to the next level in the diagram and solid lines designating an interface that does not show through to the next level in the diagram. Interfaces between firmware 34 and processor hardware 32 include a privileged application binary interface (ABI) 46 and a non-privileged ABI 48. The interfaces between SPK 36 and firmware 34 include a privileged ABI 50, a non-privileged ABI 52, and processor abstraction layer (PAL)/system abstraction layer (SAL)/extensible firmware interface (EFI) interfaces 54. The interfaces between SPGS 38 and SPK 36 include a secure platform interface (SPI) 56 and a non-privileged ABI 58. The interfaces between operating system image(s) 42 and SPGS 38 include an SPI 60, a global services interface (GSI) 62, and a non-privileged ABI 64. The interfaces between end user applications 44 and operating system image(s) 42 include an application program interface (API) 66 and a non-privileged ABI 68.

In order for SP computer system 20 to be trusted, a SP chain of trust from the system hardware, through the boot process, to final running code is established. In addition, all software code is preferably authenticated before being executed, and a properly authenticated piece of code is preferably unchangeable except by a similarly trusted component to maintain the chain of trust. The software authentication should be more than a simple check sum or other forgeable scheme. Thus, SPA 30 preferably employs strong authentication using cryptographic methods, such as public key encryption, such that software can be undetectably corrupt only if a private key is known.

The SP chain of trust typically extends back to the boot firmware 34. In one embodiment, the initial firmware 34, is programmed in read only memory (ROM). In one embodiment, the initial firmware 34 first strongly authenticates the remainder of the firmware 34, and then authenticates a boot loader in memory before control is passed to the boot loader. The boot loader, in turn, authenticates all sections of the secure platform 40 software loaded in memory before passing control.

Nevertheless, the SP chain of trust does not typically extend to loaded operating systems images 42, even though the loaded operating system image 42 is authenticated, because operating systems are subject to corruption or usurpation. Secure platform 40, however, ensures that one domain cannot accidentally or intentionally access another domain's memory. End user applications 44 are typically never trusted. The structure of the SPA 30 illustrated in FIG. 1 reflects the above hierarchy of trust.

SPK 36 is the only software ring layer in SPA 30 that runs at PL0 (i.e., the most privileged execution level) and is the only ring layer that accesses privileged system registers and executes privileged instructions. SPK 36 is preferably a very small software module, where the small size contributes to the SPK's security and correctness. Thus, in one embodiment, SPK 36 includes only the security critical services that must be protected to ensure the integrity of the SP computer system 20. Example SPK 36 security critical services include: cryptographic services; memory management; process management; and exception handling. In one embodiment, SPK 36 does not perform operating system policy-based operations such as job scheduling operations.

In one embodiment, SPK 36 abstracts privileged ABI 50, memory management, process management, and cryptographic services into a platform-independent SPI 56. SPK 36 receives requests for privileged operations, and authenticates each request before performing the corresponding privileged operation. Since SPK 36 runs at PL0, by definition SPK 36 is trusted code. In one embodiment, SP computer system 20 supports exactly one copy of SPK 36.

SPGS 38 operates at PL1 and operates in close cooperation with SPK 36 to together form secure platform 40. Although SPGS 38 is trusted code, SPGS 38 runs as an unprivileged task and employs SPK 36 to perform privileged operations. In one embodiment, SPGS 38 includes the privileged portion of device drivers. Example SPGS 38 services include: domain creation; operating system loading (i.e., booting); domain dispatch policy; input/output (I/O) initiation and completion; unprivileged call backs (UPC) signaling I/O completion; and UPC to communicate faults, traps, and interrupts.

In one embodiment, SPGS 38 includes all the services that do not absolutely have to be included in SPK 36. One reason that secure platform 40 is split into SPK 36 and SPGS 38 is to permit SPK 36 to be small, stable, and verifiable. In addition, it is preferable that SPK 36 not be updated frequently, which is desirable for security reasons.

SPGS 38 can partition operating system image layer 42 into multiple independent protection domains which operate at PL2. A protection domain is herein referred to as a software partition and associated collection of system resources, such as memory, I/O, processors, and the like, created by SPGS 38 for the purpose of loading and executing a single operating system image 42. Each of the multiple independent protection domains are capable of booting and executing an operating system image 42 or any other program capable of operation using only SPK 36 and SPGS 38 services, such as a specialized application control program.

The multiple independent protection domains running at PL2 are protected from each other through the memory protection capabilities of the four privilege level processor hardware 32, such as the memory protection capabilities of the IA-64 processor. Therefore, a failure in one of the independent protection domains typically has no effect on the other independent protection domains, even if the failure is an operating system crash. The independent protection domains provide the capability to manage system utilization on a fine-grain basis while maintaining complete security. Operating system images 42 are ported to secure platform 40 of SPA 30 similar to how operating systems are ported to a new hardware platform ISA in the classical architecture for operating systems.

End user applications 44 run at the least privileged level, PL3, as unprivileged tasks under the control of an operating system image 42 in a secure platform 40 protection domain. Typically, from the end user application perspective, the end user application 44 operates under the control of an operating system image 42 as the end user application would run under the control of an operating system in the classical architecture for operating systems.

Figure 2:
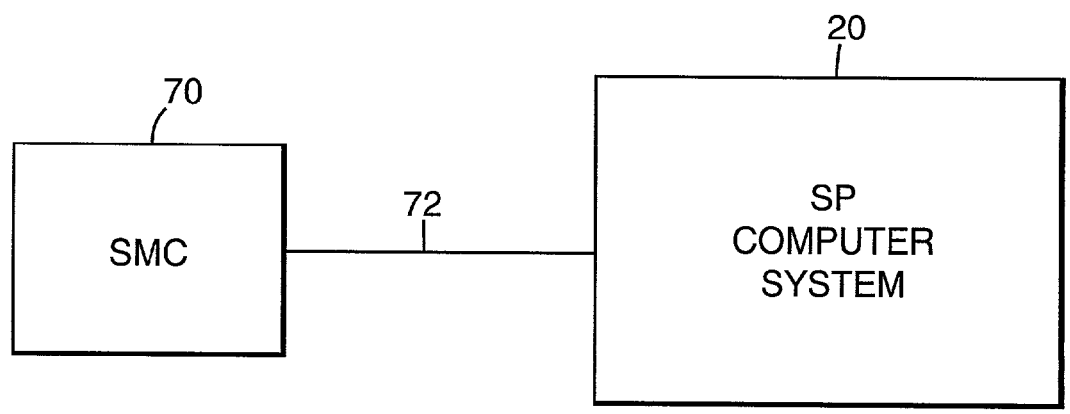
FIG. 2 is a block diagram of a system management counsel (SMC) coupled to the SP computer system of FIG. 1.

As illustrated in FIG. 2, a system management counsel (SMC) 70 is coupled to SP computer system 20 via connection 72. In one embodiment, SMC 70 includes separate independent processors, such as standard non-networked personal computers (PCs). Connection 72 can include serial interfaces (e.g., RS-232 and USB), and/or private LAN connections. SMC 70 is primarily employed to authenticate SPK 36 during SP computer system 20 initialization. In addition, SP computer system 20 is configured via SMC 70. In one embodiment, SMC 70 performs remote debugging for SPK 36 and SPGS 38.

In one embodiment, GUI interfaces for system control and management are only implemented on SMCs 70. This embodiment permits development and testing of system management interfaces and human factors in parallel with development of the rest of SP computer system 20, without having to wait for the entire SP computer system 20 to be brought up.

More than one SMC 70 can be coupled to SP computer system 20 via serial interface and/or LAN connection 72. In one embodiment, SMC 70 functions are integrated into SPGS 38 in a SP computer system 20 having a single processor, such as a workstation.

Once a SP computer system 20 is in production, one embodiment of SMC 70 is employed as a maintenance/monitor/debug/log console. In one embodiment, SMC 70 is employed to install and update critical hardware and software components into SP computer system 20 in a secure manner.

SPA 30 must carefully ensure the SP chain of trust in addition to having the normal bootstrapping concerns of a conventional operating system. Thus, the flow of execution from the initial instruction fetch of each processor 32 to the execution of a secure operating system image 42 preferably never allows the execution of untrusted code. In one embodiment, the first instruction a processor 32 executes is from a soldered-in ROM to thereby start the boot sequence in a secure manner.

II. Hardware Protection Mechanisms Employed by SPA

A better understanding of how SPA 30 utilizes processor hardware protection mechanisms to ensure the SP chain of trust is better understood by first providing a more detailed discussion of these protection mechanisms in an example IA-64 type processor. Similar protection mechanisms are also provided in the PA-RISC processor.

Figure 3:
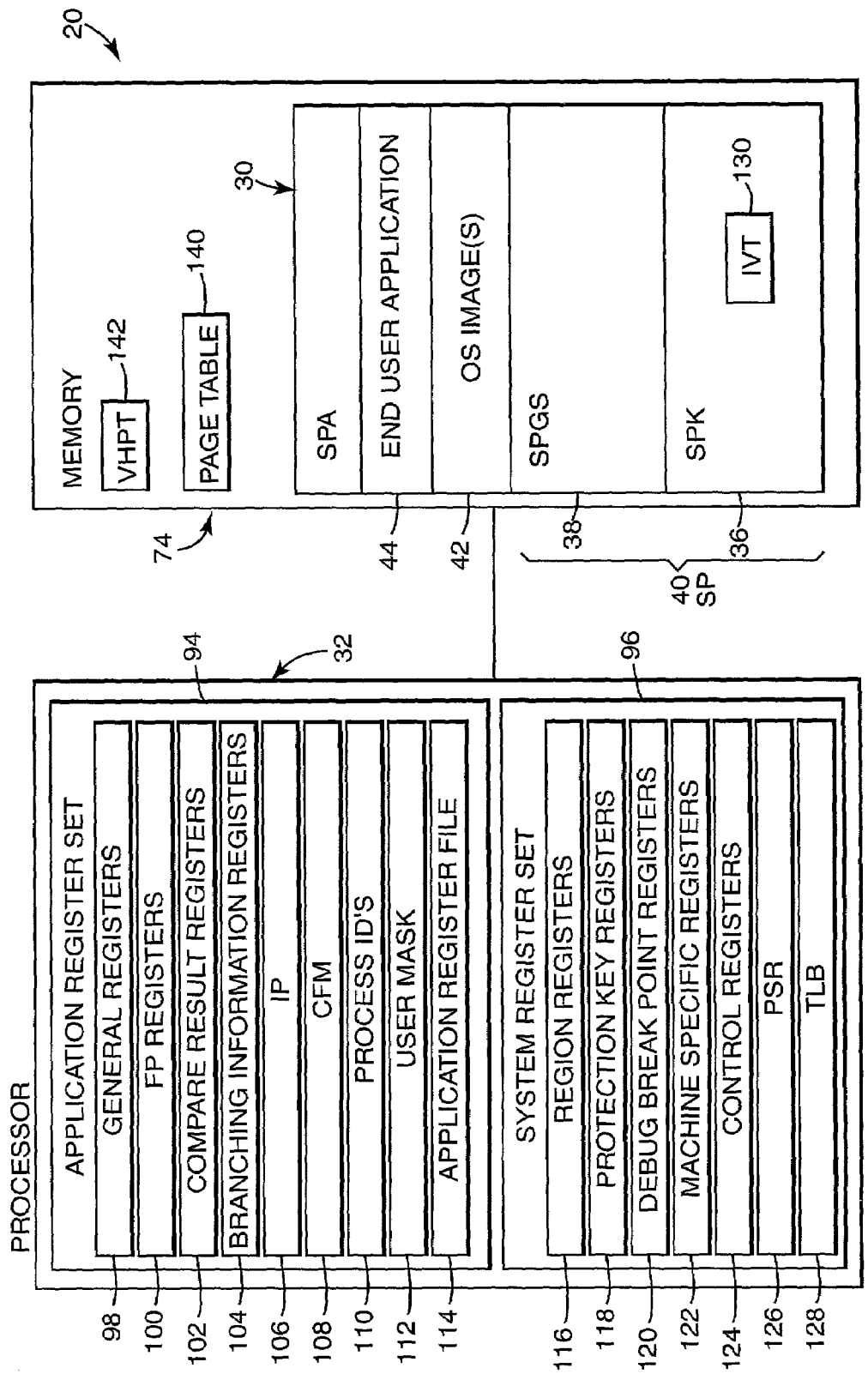
FIG. 3 is a block diagram of one embodiment of a SP computer system illustrating portions of the SP computer system relevant to an architectural state of the SP computer system contained in at least one processor and memory.

FIG. 3 illustrates portions of one embodiment of SP computer system 20 relevant to an architecture state of SP computer system 20 contained in at least one processor 32 and memory 74. Processor 32 includes an application register set 94 and a system register set 96. The architectural state of SP computer system 20 is represented by application register set 94, system register set 96, and memory 74. Application register set 94 includes registers available to application programs (i.e., end user applications 44) stored in memory 74. System register set 96 provides system register resources for process control, interruption handling, protection, debugging, performance monitoring, and the like. System register set 96 would generally only be visible to the operating system in a classical architecture, but in SPA 30 the system register set is generally only directly visible to secure platform 40.

Example registers that can be included in application register set 94 include general registers 98, floating point (FP) registers 100, compare result registers 102, branching information registers 104, instruction pointer (IP) 106, current frame marker (CFM) 108, process identifiers (ID's) 110, user mask 112, and an application register file 114.

Example registers that can be included in system register set 96 include region registers 116, protection key registers 118, debug break point registers 120, machine specific registers 122, control registers 124, a processor status register (PSR) 126, and a translation look-aside buffer (TLB) 128. PSR 126 maintains control information to define the current execution environment for the current running process of processor 32. TLB 128 holds recently used virtual to physical memory address mappings to memory 74.

SPK 36 in memory 74 includes an interruption vector table (IVT) 130. IVT 130 stores a plurality of interruption handlers. Interruptions are handled by SPK 36 at an address determined by the base location of IVT 130, offset by an amount based on the particular interruption that occurred. Each interruption has its own architected offset into IVT 130. When an interruption occurs, processor 32 stops execution at the current IP 106, sets the privilege level in the PSR.cpl field of PSR 126 to the highest privilege level, PL0, and begins fetching instructions from the address of the entry point to the interruption handler in IVT 130 for the particular interruption that occurred. Interruption handlers may be contained entirely within IVT 130, or alternatively, interruption handlers may branch to code outside IVT 130 if more space is required.

One embodiment of general registers 98 are partitioned into static general registers including general registers GR0 through GRm and stacked general registers including general registers GRm+1 through GRn. The static general registers are typically visible to all procedures. The stacked general registers are typically local to each procedure and may vary in size from zero to (n–m) general registers. In one embodiment, a register stack mechanism in SP computer system 20 is implemented by hardware-controlled register renaming of addresses as a side-effect of procedure calls and returns. The register stack mechanism is not otherwise visible to end user applications 44. The static general registers are saved and restored at procedure boundaries according to software convention. The stacked general registers are automatically saved and restored by a register stack engine (RSE) without explicit software intervention. In one embodiment, a portion of the stacked general registers can be programmatically renamed to accelerate loops.

One embodiment of floating-point registers 100 are partitioned into static floating-point registers including floating-point registers FP0 through FPm and rotating floating-point registers including FPm+1 through FPn. In one embodiment, the rotating floating-point registers can be programmatically renamed to accelerate loops.

In one embodiment, TLB 128 is divided into a data TLB for holding virtual to physical data address mappings and an instruction TLB for holding virtual to physical instruction address mappings. Virtual memory pages are mapped to physical memory pages by a data structure controlled by SPK 36 referred to as a page table 140, which is stored in memory 74 and contains entries that each map a single memory page of memory 74. Page table 140 maps pages containing both instructions and data and typically instructions and data do not share the same page. TLB 128 improves performance by caching page table 140 entries in processor 32.

Processor 32 has a current privilege level represented by a current privilege level field (PSR.cpl) in PSR 126. The current privilege level stored in the PSR.cpl field controls accessibility to system resources in processor 32, such as the system registers in system register set 96, system instructions, and system memory pages. The current privilege level stored in the PSR.cpl field varies between four execution privilege levels in the IA-64 and PA-RISC processors.

Programs that include instructions for execution by processor 32 are stored in memory pages bounded in virtual address space.

Entries in TLB 128 include an access rights field (TBL.ar) and a privilege level field (TBL.pl). In one embodiment of SP computer system 20, memory page granular access controls employ four levels of privilege. In one form of this embodiment, privilege level 0 (PL0) is the most privileged level and has access to all privileged instructions, and privilege level 3 (PL3) is the least privileged level. In one embodiment of SP computer system 20, access to a memory page is determined by the TLB.ar field, the TLB.pl field, and the current privilege level stored in the PSR.cpl field. Page access rights are defined in Table I below for an example embodiment of SP computer system 20 having eight levels of access rights defined for the virtual memory page by the TBL.ar field and four levels of privilege as defined for the virtual memory page by the TBL.pl field and four levels of privilege defined for processor 32 by the PSR.cpl field.

TABLE I

Page Access Rights

| TBL.ar | TBL.pl | PSR.cpl 3 | 2 | 1 | 0 | Description |
|---|---|---|---|---|---|---|
| 0 | 3 | R | R | R | R | Read only |
|   | 2 | — | R | R | R |   |
|   | 1 | — | — | R | R |   |
|   | 0 | — | — | — | R |   |
| 1 | 3 | RX | RX | RX | RX | Read, execute |
|   | 2 | — | RX | RX | RX |   |
|   | 1 | — | — | RX | RX |   |
|   | 0 | — | — | — | RX |   |
| 2 | 3 | RW | RW | RW | RW | Read, write |
|   | 2 | — | RW | RW | RW |   |
|   | 1 | — | — | RW | RW |   |
|   | 0 | — | — | — | RW |   |
| 3 | 3 | RWX | RWX | RWX | RWX | Read, write, execute |
|   | 2 | — | RWX | RWX | RWX |   |
|   | 1 | — | — | RWX | RWX |   |
|   | 0 | — | — | — | RWX |   |
| 4 | 3 | R | RW | RW | RW | Read only/ read, write |
|   | 2 | — | R | RW | RW |   |
|   | 1 | — | — | R | RW |   |
|   | 0 | — | — | — | RW |   |
| 5 | 3 | RX | RX | RX | RWX | Read, execute/read, write, exec |
|   | 2 | — | RX | RX | RWX |   |
|   | 1 | — | — | RX | RWX |   |
|   | 0 | — | — | — | RWX |   |
| 6 | 3 | RWX | RW | RW | RW | Read, write, execute/read, write |
|   | 2 | — | RWX | RW | RW |   |
|   | 1 | — | — | RWX | RW |   |
|   | 0 | — | — | — | RW |   |
| 7 | 3 | X | X | X | RX | Exec, promote/read, execute |
|   | 2 | XP2 | X | X | RX |   |
|   | 1 | XP1 | XP1 | X | RX |   |
|   | 0 | XP0 | XP0 | XP0 | RX |   |

Within each cell of Table I above, "–" represents no access, "R" represents read access, "W" represents write access, "X" represents execute access, and "Pn" represents promote the PSR.cpl field to privilege level "n" when a privilege promotion instruction, such as the enter privileged code (EPC) instruction in the IA-64 ISA, is executed.

In one embodiment, processor 32 verifies page level permissions to a given virtual page by verifying privilege levels, page level read and write permission, and protection key read and write permission.

Referring to Table I above, execute-only pages (e.g., TLB.ar=7) can be used to promote the current privilege level stored in the PSR.cpl field on entry into a more privileged page. Lower privileged code, such as an end user application 44 (PL3), can call into a promotion memory page, such as a memory page controlled by operating system image 42 (PL2), SPGS 38 (PL1), or SPK 36 (PL0). The more privileged code executes a privilege promotion instruction, such as the EPC instruction in the IA-64, to promote the current privilege level stored in the PSR.cpl field. When the privilege promotion instruction successfully promotes the current privilege level stored in the PSR.cpl field, a higher privileged routine can be executed directly by the lower privileged code without an overhead of an interruption to the more privileged code. A procedure return branch instruction demotes the current privilege level stored in the PSR.cpl field back to the original lower privilege level after the higher privileged routine has been executed.

Figure 4:
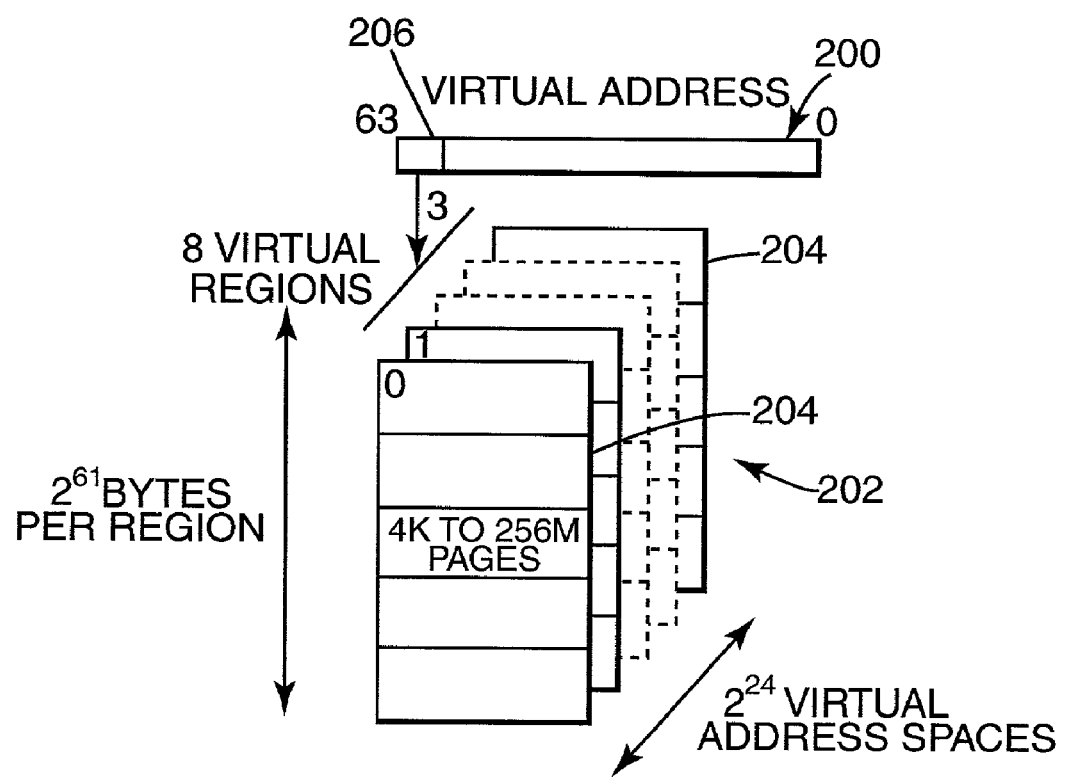
FIG. 4 is a diagram illustrating example virtual address spaces for an example IA-64 processor.

Example virtual address spaces for an example processor 32 implemented as an IA-64 processor are illustrated in diagram form in FIG. 4. From the IA-64 application program's point of view, the virtual addressing spaces are essentially 64-bit flat linear virtual address spaces. General registers 98 (shown in FIG. 3) are 64 bits wide and are used as pointers into the virtual address base.

In the embodiment illustrated in FIG. 4, a virtual address, indicated at 200, points into the virtual address spaces, indicated at 202. The 64-bit virtual address spaces 202 are divided into eight $2^{61}$ byte virtual regions 204. A virtual region 204 is selected by an upper 3 bit field of the virtual address referred to as a virtual region number (VRN), indicated at 206. A region register 116 (shown in FIGS. 3 and 5) is associated with each virtual region 204 and specifies a 24-bit region identifier, (i.e., unique address space number), indicated at 207 in FIG. 5, for a virtual region 204. Eight of the possible $2^{24}$ virtual address spaces are concurrently accessible via 8 region registers 116 (rr0, rr1, . . . , and rr7). The region identifier (ID) 207 can be considered the high order address bits of a large 85-bit global address space for a single address space model, or as a unique ID for a multiple address space model.

Figure 5:
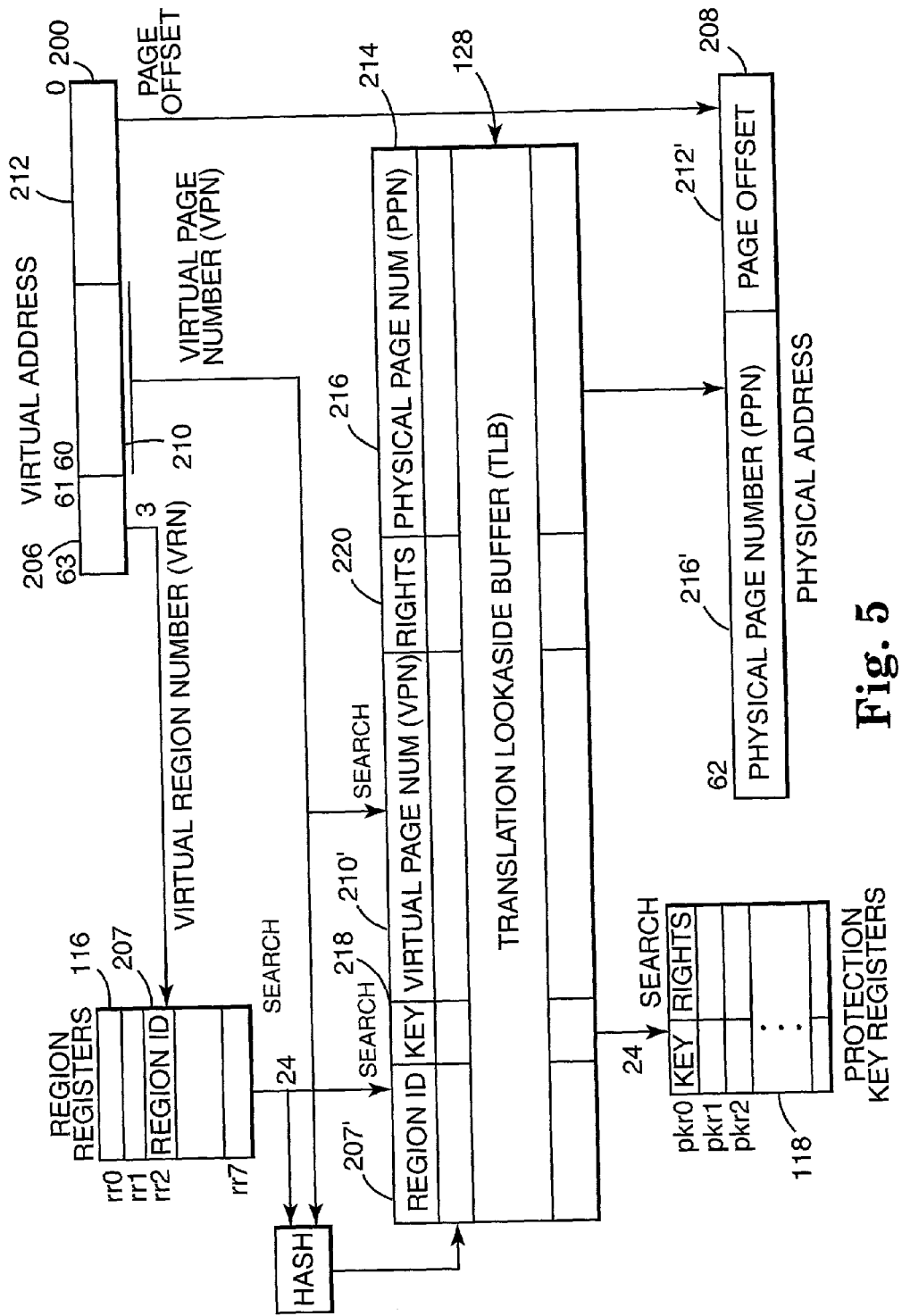
FIG. 5 is a diagram illustrating a conceptual virtual address translation employed by an example IA-64 processor.

A conceptual virtual address translation employed by an example IA-64 processor is illustrated in diagram form in FIG. 5 to illustrate the process of mapping a virtual address 200 into a physical address 208. Each virtual address 200 includes VRN field 206, a virtual page number (VPN) field 210, and a page offset field 212. In the embodiment illustrated in FIG. 5, the upper 3-bits of virtual address 200 form VRN field 206, the least-significant bits of virtual address 200 form page offset field 212, and the remaining middle bits of virtual address 200 form VPN field 210. Page offset field 212 is passed through the translation process unmodified and forms a page offset field 212' of physical address 208. The exact bit positions for page offset field 212 and the VPN field 210 vary depending on the page size used in the virtual mapping (e.g., page sizes from 4K to 256M bytes per page).

On a memory reference, VRN field 206 selects a region ID 207 from one of the eight region registers 116. TLB 128 is then searched for a translation entry 214 with a matching VPN 210' and region ID 207' value. If a matching translation entry is found in TLB 128, a physical page number (PPN) field 216 of the matching translation entry 214 forms the PPN field 216' of physical address 208. PPN field 216' is concatenated with the page offset field 212' to form physical address 208. In one embodiment, matching translations are qualified by page-granular privilege level access right checks and protection domain checks by verifying that a protection key field 218 of the matching translation entry 214 is contained within a set of protection key registers 118, and read/write execute permissions are granted based on a rights field 220 of the matching translation entry 214. Rights field 220 contains the TBL.ar and TBL.pl fields discussed above and further defined in above Table I. If the required translation entry 214 is not stored in TLB 128, in one embodiment processor 32 can also optionally search a virtual hash page table (VHPT) 142 (shown in FIG. 3) in memory 74 and install the translation entry 214 into TLB 128.

If the required translation entry 214 cannot be found in TLB 128 and/or VHPT 142, processor 32 raises a TLB miss fault to request that SPK 36 supply the translation entry 214. After the SPK 36 installs the translation entry 214 in TLB 128 and/or VHPT 142, the faulting instruction can be restarted and execution resumed.

In one embodiment, virtual addressing for instruction references are enabled in an example IA-64 processor 32 by setting an instruction address translation field (PSR.it) in PSR 126 to a 1. In one embodiment, virtual addressing for data references are enabled when a data address translation field (PSR.dt) in PSR 126 is set to 1. In one embodiment, the register stack accesses are translated when a register stack translation field (PSR.rt) in PSR 126 is set to 1.

III. Secure Platform Kernel

One embodiment of SPK 36 provides initial SP computer system 20 start-up, privileged functions, low-level memory and process management, and first-level exception handling. SPK 36 is the only software in SP computer system 20 that executes at the most privileged level, PL0.

The SP chain of trust for SPA 30 is based on the above described processor 32 hardware memory protection mechanisms. For example, when processor 32 is implemented as an IA-64 processor, processor privilege level, region IDs, protection keys, and page access rights are primitives upon which domains and processes are protected from one another in SPA 30. The code that is executed from memory 74 to manipulate these processor resources extends the SP chain of trust throughout SP computer system 20. In one embodiment, SPK 36 only contains code that must run at PL0 to perform security critical services, such as memory management, processor management, or interruption vectors, and cryptographic services. In one embodiment, SPK 36 does not perform operating system policy based operations such as job scheduling operations. In addition, SPK 36 employs protection keys to control its own access to critical structures.

A. Privileged Operations

In one embodiment, an example IA-64 processor 32 has implicit and explicit privilege transitions. The implicit transitions are through interruptions wherein the execution privilege level (PL) is set to zero (PL0); through the return from interruption (RFI) instruction where PL is set to the value of a IPSR.cpl field of an interruption PSR (IPSR) register of control registers 124; and through the branch return (br.ret) instruction where PL is set to the lesser of PSR.cpl field of PSR 126 and the value of the previous privilege level AR.PFS.ppl field of a previous function state register of application register file 114. Explicit privilege transitions are initiated by the EPC instruction, which as described above, can raise the PL to the PL specified for the page containing the EPC instruction if the page properties are set appropriately in TLB 128.

B. Normal Exceptions

In one embodiment, when an exception occurs, an exception handler saves sufficient state information to resume the code that was executing when the exception occurred. When an exception occurs, the exception handler also modifies some of the system state so the exception handler can execute in a secure and controlled manner. The exception handler assures that the stack and the RSE save area are in appropriately secured memory. Once the exception handler performs these actions, it is possible to re-enable interrupts and execute the appropriate interruption handlers.

C. Fast-Path Exceptions

In one embodiment, a class of exception handlers is executed frequently and very short, such as a TLB miss handler. This class of exception handlers is sufficiently short to run entirely with interrupts disabled and without using the stack and RSE.

D. Return from Interruption

In one embodiment, when an interruption handler resumes the previous instruction stream, the interruption handler executes the RFI instruction, which loads PSR 126 and IP 106 from control registers 124. Since the current privilege level is in the PSR.cpl field of PSR 126, a privilege level transition usually occurs.

In one embodiment, many of the bits/fields in PSR 126 can be set by an operating system image 42, while other bit/fields are only controlled via SPK 36. When an interruption handler is set to return, the PSR 126 bits/fields are managed as indicated in the following Table II.

TABLE II

| PSR Bits/Fields | Description | UPC | Exception Exit |
|---|---|---|---|
| mfh, mfl, ac, up, be | User mask: unprivileged | Preserve mfh, mfl | Accepted |
| dfh, dfl | Floating point management | Set per exception PSR | Accepted |
| sp, pp, di, si, db, tb, is, id, da, dd, ss, ri, ed, ia, lp | Debugging | Cleared by exception | Accepted |
| pk, dt, rt, it | Translation & Protection | Forced to 1 | Forced to 1 |
| i, ic, bn | Interruption | Forced to 1 | Forced to 1 |
| Mc | Machine Check Mask | Forced to 0 | Forced to 0 |
| Cpl | Privilege level | Set to 2 | Set to 2 or 3 |

E. Function Call Return

In one embodiment, during a call return operation when a function returns, the current privilege level is set to the lesser privileged (i.e., numerically greater value) of the PSR.cpl field of PSR 126 and the AR.PFS.ppl field of the PFS register of application register file 114. This prevents software from surreptitiously raising its privilege level, but allows direct returns to less privileged code.

F. Register Stack Security Implications

The example register stack described above for an example IA-64 processor 32 is a mechanism created to facilitate fast procedure calls and returns. In the IA-64 register stack, the number of physical registers can be greater than the number of logical registers, and when a new register frame is allocated, the request can be satisfied by using some of the extra physical registers.

Unfortunately, there is a security issue with the IA-64 register stack that can allow information to leak from privileged code to unprivileged code. One reason for this potential register stack security issue is that the IA-64 register stack is a singular hardware component, which is shared across tasks and privilege levels. Another reason for the potential register stack security issue is that the IA-64 register stack does not automatically clear the contents of stack entries when the stack entries are allocated. This allows a malicious program to request registers and then examine the previous contents of those registers, which might have belonged to a different process or privilege level.

Code that manipulates sensitive information, such as cryptographic keys, should be aware of this potential register stack security issue and keep sensitive data in static registers and explicitly clear the contents of the registers before returning.

G. EPC Transitions

As described above, in one embodiment an example IA-64 processor 32 provides a mechanism to increase the current privilege level via the EPC instruction. In order for a privilege increase to occur, a memory page with special permissions is created, and if an EPC instruction is executed on that page, then the privilege is promoted to match the privilege of the page. Only the current privilege level is changed: the remainder of the machine remains the same, which has security implications, as discussed below.

1. EPC Page Creation

In order for the EPC instruction to change the privilege level, special TLB 128 permissions are set for the page on which the EPC instruction resides in memory 74 to indicate that the page can be used for privilege promotion. Since only privileged code is allowed to manipulate TLB 128 entries, SPK 36 provides a service to create EPC pages in memory 74. In one embodiment, SPK 36 provides a mechanism for a PL2 guest operating system image 42 to associate a routine in its code space with an EPC instruction on a properly set up page in memory 74.

This SPK 36 service also permits protection keys to be changed at every privilege transition for secure processes. Protection keys being changed at every privilege transition, precludes the use of some sort of pre-formatted EPC page being created by the PL2 operating system image 42, and then inspected and installed by SPK 36. Instead, SPK 36 inserts code that the PL2 operating system image 42 does not know about into the EPC path.

2. EPC Security Issues

The example RSE described above is an asynchronous processor 32 component that attempts to opportunistically flush dirty registers from the register stack to a backing store in memory 74. If there are sufficient idle memory cycles, the RSE allows the saving of stacked registers to occur totally in the background.

Prior to making an EPC call, the code that is executing is unprivileged and in control of the current RSE state, which leaves the called routine vulnerable to two types of attacks. In the first type of attack, unprivileged code gains access to local variables of privileged code by having one thread manipulate the RSE memory while another thread is executing an EPC instruction. The second type of attack involves calling the privileged code with RSE space exhausted. In order to prevent these two types of attacks, one embodiment of SPK 36 switches the RSE pointers prior to making any calls that allocate registers from the register stack.

In one embodiment, a leaf EPC routine prevents the first type of attack by setting the RSE to enforce a lazy mode, then allocating registers for its use, and having fault handler code in place to handle the RSE running out of backing store. It is unlikely this leaf EPC routine solution is enough to justify the complexity of having the additional mechanisms required to support it, as well as the additional problems created when a leaf routine becomes a non-leaf routine.

The stack is typically vulnerable to the same attacks as the RSE, and privileged components preferably switch to a protected SP 40 stack before using the stack. In one embodiment, this switching is not performed for lightweight calls, because in this embodiment, the stack is only used by the calling convention for routines with more than eight parameters and there is no autonomous engine transferring data to the stack.

H. Unprivileged Callbacks (UPCs)

Even though an example IA-64 processor 32 provides the EPC instruction, which provides a fairly efficient and secure method for code running at a lower privilege level to invoke code at a higher privilege level, the example IA-64 processor 32 ISA does not define a mechanism to allow higher privilege code to securely call lower privilege code. Higher privilege code securely calling lower privilege code is required in a number of situations, most of which are related to processor interruptions.

In one embodiment, an unprivileged call back (UPC) is a mechanism provided to allow these transitions to lower privilege. UPCs are employed to notify the PL2 operating system image 42 when a trap or fault occurs while executing code within that operating system image or its PL3 end user application 44 components, as well as to notify the PL2 operating system image 42 when I/O has completed. In one embodiment, UPCs are only used to invoke routines in PL2-3 code. If an interruption occurs while executing in PL0-1 code, the code invoked by the processor 32 hardware directly calls an appropriate routine.

Since UPCs are used in place of processor 32 hardware interrupts to notify domains of external events, disabling UPCs are included so that the disabling UPCs can be used in a similar manner as disabling interrupts. Disabling UPCs only results in the UPCs being queued with no change to the actual processor 32 hardware interrupt state, which typically always has interrupts enabled when PL2-3 code is executing. As is the case with the processor 32 hardware, disabling UPCs applies only to external interrupts and not to traps or faults.

Processor 32 hardware allows priorities to be assigned to interrupts, and allows interrupts to nest according to their priorities. In order to maintain the processor 32 hardware semantics, one embodiment of the UPC mechanism supports priorities and nesting.

1. Context Save and Restore

When an interruption occurs, it is generally necessary for the interruption handler to save some of the original state before processing the interruption. The example IA-64 processor ISA provides a mechanism referred to as shadow registers that provides space for interruption handlers to save all the necessary registers. A very lightweight assembly language routine can execute entirely within the shadow registers with interrupts disabled, so that no registers need to be saved. The vast majority of interruption handlers, however, have interrupts enabled and these interruption handlers save and restore the appropriate registers. There are three classes of registers that must be dealt with differently with respect to where the registers are saved and by the type of mechanism that saves the registers.

The first class of registers includes all the registers that the IA-64 processor ISA calling convention lists as callee save. The first class of registers, if used, are automatically saved and restored by routines upon entry and exit, and do not require explicit action by the interruption handlers. The remaining two classes of registers do require explicit action. The second class of registers includes the volatile system control registers. The third class of registers includes all the registers listed by the IA-64 processor ISA calling convention as caller-save.

Volatile system control registers are registers that the processor 32 hardware overwrites when an interruption occurs. Therefore, the volatile system control registers are saved before interruptions are re-enabled.

The caller-save registers are saved, because while interruptions cause a transfer of control, the interruptions do not do so via the calling convention. The code that was executing prior to the interruption does not save these registers, and none of the interruption code that follows the calling convention saves these registers. If the interruption handler calls any other routines that follow the calling convention, these registers are saved first, because the called route is allowed to destroy the registers' contents. In one embodiment, one of the very low-level interruption handlers performs these saves so that the remainder of the interruption code can simply follow the calling conventions.

For security reasons, some of the registers, or some portions of bit encoded registers like PSR 126, that must be saved should not be modifiable by unprivileged code. Since the unprivileged code might be allowed to read the contents of these registers, these registers will likely be stored in both writable memory with the rest of the saved registers and in an unwritable area within SP 40. When the unprivileged code has returned, these registers are updated to correctly reflect their writability.

A side effect of using the calling convention to save the caller-save registers is that there is no single place where software, such as a debugger, can find a process's entire register state at the time of an interruption. As a result, the only state of the interrupted process that a UPC handler can easily find is the explicitly saved registers. The pointer to the saved registers is passed as a parameter to the UPC routine, which can modify the registers to which it points.

2. UPC List

In order to facilitate the handling of these situations, SPK 36 provides the UPC mechanism that allows SP 40 to invoke code asynchronously in the PL2 operating system image 42. SPK 36 accomplishes this by maintaining a list of pending UPCs for a domain. SPK 36 actually maintains two lists. One first list is maintained per process for faults and traps. One second list is maintained per processor 32 per domain for interrupts. Having a UPC list per processor 32 allows interrupts to be directed at a specific processor 32 if such affinity is desired, and provides the basis for an interprocessor communication facility.

The UPC model loosely mimics the semantics of the UNIX signal model, which is a form of UPC. When a signal occurs in UNIX for which a handler is registered, the kernel notes that it is pending and arranges for the user process signal handler to be invoked the next time that process is run.

If the UPC at the head of the list will be executed the next time processor 32 executes code with PL greater than or equal to two for this domain, the semantics of the processor 32 hardware can be preserved.

One example embodiment of the interruption handling code is represented by the following Example Pseudo Code Fragment I.

---
Example Pseudo Code Fragment I

```
reg_savep = find register save area;
save required registers into reg_savep;
enable interrupts;
handle this interrupt(reg_savep) ;
/*
   register state - All registers saved by the calling
   convention are as they were at the time of the
   interruption.
   Modifications to registers saved in reg_savep will be
   visible to the interrupted code upon return
*/
```

-continued

Example Pseudo Code Fragment I

```
while ((UPCs_enabled(this_processor) &&
    !UPC_List_Empty(this_processor->UPC_list) &&
    (!Currently_in_UPC(this_processor) ||
    (UPC_priority(current_UPC)<
        UPC_Priority(this_processor->UPC_list_head) )
{
    this_upc = this_process->UPC_list_head
    ExecuteUPC(this_upc, reg_savep);
}
/* register state - see above comment */
disable interrupts;
restore_registers from reg_savep;
rfi
```

3. Delivery Semantics for Interrupts and Exceptions

In order to preserve the semantics that the processor 32 hardware presents to PL0 code, it is necessary to process interrupts in first in first out (FIFO) order, and exceptions in last in first out (LIFO) order. Thus, in one embodiment, interrupts are inserted at the tail of the UPC list and exceptions are inserted at the head of the UPC list. This embodiment does not allow for the preservation of exact instruction ordering with respect to the processor 32 hardware for handling nested interrupts, but this embodiment allows the interrupts to be completed in the correct order.

Since external interrupts are queued in FIFO order, and clock interrupts are delivered using FIFO order, device completion events being possibly delayed for an arbitrary amount of time should not cause timeout problems for the guest operating system image 42. If the device completion event occurred before the clock tick that would have caused it to timeout, the PL2 operating system image 42 will also see the device completion event before it senses the clock tick.

This could, however, cause a problem for a guest operating system image 42 that implements timeouts by polling an interval timer. In one embodiment this problem is solved by enabling secure interval timer mode while UPCs are pending and updating the interval timer register to correspond to clock ticks.

When a trap or exception occurs, it is always related to the currently running code and can be delivered immediately. External interrupts can belong to domains that are not currently in context and have to be deferred until the appropriate domain is in context.

4. Registration

The UPC mechanism employs a registration model similar to the UNIX signal model. The UPC mechanism maintains a list of possible UPC types, similar to signal numbers, with each UPC type having an associated action. The default action for most of the UPC types is to terminate the guest operating system image 42 if the events occur, but one of the first operations performed by a guest operating system image 42 is to register handlers for these events. When one of the events occurs, the next instruction executed at PL2 is the first instruction of the handler for the event.

I. Memory Management

In one embodiment, SP computer system 20's physical memory 74 is never directly referenced or managed by software executing above privilege level 0 (PL0). Instead, SPK 36 provides abstractions to allocate, map, unmap, and free virtual addresses. The operating system image(s) 42, as well as much of the SP 40 software, do not need to know which physical addresses are used to back their virtual addresses. This is a component of hot-plug and hot sparing of memory 74 components: SP 40 via SPK 36 manages the details behind the virtual addresses, with little or no involvement from the operating system image(s) 42.

It is unnecessary, however, to keep the physical addresses secret from the operating system image(s) 42. Since the operating system image 42 runs unprivileged, it cannot access the physical memory 74 or use the physical address to circumvent memory protection, but dependencies based on physical addresses cannot be relied upon. Thus, virtual address look-ups do not white out the physical page frame information, which may be used for certain operating system optimizations, such as coalescing reads and writes.

1. Pages

In one embodiment, physical memory 74 is managed in units of pages, and legal page sizes are at least the processor 32 hardware-supported TLB 128 page sizes. Each operating system image 42 is configured at a minimum page size, which affects the size of the VHPT 142, and may affect performance due to TLB 128 miss rates.

In one embodiment, write and execute permissions are mutually exclusive for all SP 40 code (PL0-1). Overall system security is enhanced if the write and execute permissions are mutually exclusive for all code (PL0-PL3). In certain cases, however, it is desirable for the kernel to set write and execute permissions together, usually in conjunction with a kernel (PL2) debugger, just-in-time compiler, or runtime optimizer. In situations where code must be modified dynamically, the trustworthiness of that code has already been compromised; this is viewed as an exceptional circumstance. In one embodiment, SP 40 provides a mechanism that enables an operating system image 42 to modify executable code without requiring both write and execute to be set for the pages containing that code. Where applicable, this provides a more secure implementation.

2. Protection Keys

In one embodiment, protection keys are globally allocated by SPK 36 for both SP 40 internal and operating system image 42 use. Instead of using the actual protection key values, software above SPK 36 uses handles. These handles are verified whenever a protection key is assigned to a page. Protection keys assigned to a process are referred to as the active protection keys. The active protection keys can be assigned with zero or more access disable bits set.

3. Areas, Anchors and Backing

In one embodiment, SPK 36 manages virtual memory in units called areas, where an area is a contiguous range of virtual addressability. An area may be considered as a two-level page table, where the actual implementation is opaque to software above SP 40. In one embodiment, areas are created by a call to SPK 36, specifying the area's page size (at least the operating system minimum page size) and the area size, both of which are specified as a $2^n$ value.

Initially, an area is empty such that no physical pages are associated with the virtual address range. Above SPK 36, unique handles identify areas. Handles are validated on all subsequent calls to SPK 36 area-related calls.

An area, by itself, does not have a virtual address. In one embodiment, before any physical memory 74 is associated with an area, it must be anchored in at least one address context. Anchoring defines the area's 64-bit base virtual address, which must be aligned to the area size. An area can be anchored in multiple address contexts, and may be multiply anchored in a single context. An area keeps an anchor reference count. When the area is unanchored, the area can be deleted if the reference count goes to zero.

Once an area is anchored, pages in its address range can be backed with physical memory 74. A SPK 36 call to back memory does not return the physical address. Instead, the SPK 36 call to back memory fills in the appropriate information in the area structure, inserts an entry or entries in VHPT 142, and returns. For security, in one embodiment, all pages are cleared before backing a virtual address. Multiple pages can be backed in a single call, but the call is atomic. Either all pages are backed successfully, or none of the requested pages are backed.

In one embodiment, access rights and protection keys are associated with pages when they are backed and may be changed dynamically. Access rights define the most permissive page access allowed. A process may have more restricted access if the process's active protection key has access disable bits set. The privilege level for a page cannot be set higher (i.e, numerically lower) than the caller's privilege level.

4. Addressing Context

In one embodiment, the addressing context is a non-overlapping collection of anchored areas comprising a 64-bit virtual address space. While anchoring establishes the 64-bit virtual address for an area within a context, the extended virtual address depends on the process(es) associated with the context. Processes sharing an address context can, on a per-region basis, share the areas aliased (i.e., different region ID) or unaliased (i.e., same region ID).

Like areas, addressing contexts are identified above the SPK 36 level by handles that are validated on each related SPK 36 call.

J. Process Management

A process is herein defined as an operating system construct comprising the state and resources of a computation. A process context includes identification, scheduling status and priorities, current and root directors, open files, message or signal handlers, general registers, stack and instruction pointers, addressing context, and associated kernel structures. Within a process context, one or more dispatchable objects represent the processor 32 subset of the process context: certain general registers 98, stack, and instruction pointers (e.g., IP 106).

Since certain elements of a process context, such as addressing and protection, must be set using privileged instructions, in one embodiment, SPK 36 is involved in their creation and management. SPK 36 handles, however, only those elements of the process context that it must, either due to required privilege or because SPK 36 specifies the content and format. For example, the floating-point context is not handled by SPK 36, rather the higher-level software is responsible for saving and restoring these registers as needed.

1. Privileged Context

The portion of process context managed by SPK 36 is called the privileged context (PCX) and is stored in memory 74 protected against PL1-3 access. The PCX includes two major components: the addressing state, and the exception state.

2. Addressing State

The addressing state defines the full addressability of a dispatchable object. The addressing state includes an addressing context, region ID values, and active protection key values. The addressing context and region ID values together specify the full addressing available to the process. The region ID for virtual region number (VRN) 7 is fixed for a given domain. The remaining seven region IDs for VRN 0 through 6 may be individually shared or unique. This permits information to be shared, unaliased or aliased, and supports both multiple address space and single address space memory models.

The PCX includes a set of active protection keys. The active protection keys are typically assigned by the operating system images 42 to set full, partial, or no access to pages in the addressing context. If the number of active protection keys is greater than the available protection key registers 118, SPK 36 employs the protection key registers as a cache, dynamically replacing the protection keys on protection faults. There is some performance penalty for having too many active protection keys.

3. Exception State

In one embodiment, when a PCX is created, the caller must specify two pieces of information: a memory block where application exception state can be saved; and a PSR 126 mask. The PSR 126 mask is the operating system's setting for certain bits, such as endianness or floating-point register disable.

When an exception occurs while executing an end user application 44 (PL3), SPK 36 stores all caller-saved registers in an architected exception state frame at the specified memory block. If the exception results in an operating system UPC, some bits from the specified PSR 126 mask will be combined with the current PSR 126 and set as IPSR of control registers 124 for the UPC RFI instruction.

4. PCX Creation

In one embodiment, the first PCXs in a domain, one per domain processor 32, are set up by SPGS 38 before transferring control to the operating system entry point. A process can make a copy of itself, modifying none, some, or all of its addressing state, similar to a Linux clone( ) system call.

5. PCX Dispatch

In one embodiment, a SPK 36 service switches between two dispatchable objects on the same processor 32. A SPK 36 dispatchable object is the PCX, plus the minimum state needed to restart the current execution. An example SPK 36 dispatchable object includes: the current stack pointer and RSE state; the return pointer; all callee saved static general registers and the associated NAT bits; and UPC control setting.

In one embodiment, an operating system image 42 switches dispatchable objects by calling a spSwitch( ) EPC entry point, passing a handle to the new PCX. SPK 36 saves the current dispatch state, installs the new addressing state, restores the old dispatch state, and then returns to the saved return pointer. When a dispatchable object is redispatched, the dispatchable object appears to the caller as if it returned from spSwitch( ).

SPK 36 does not perform scheduling. Scheduling is a policy based operation implemented by an operating system image 42 for its processes, and by SPGS 38 for its domain(s).

6. PCX Exit

In one embodiment, when a process is to be terminated, two options are available. If the process is ready to have its addressing context torn down, the process calls spSwitch( ) with a special discard flag. In this case, SPK 36 does not save the new state, but tears down the old process structure and reclaims its resources.

Alternatively, a process can have its resources released by another process. In this case, the clean-up process calls spCleanUp( ) with the target PCX handle. This call specifically disallows any dispatched object in the domain from being removed.

In both options, it is the operating system image's 42 responsibility to perform all higher-level clean up.

K. SPK Cryptographic Services

SPK 36 cryptographic services are available to SPGS 38, operating system images 42, and end user applications 44. In one embodiment, interfaces to the cryptographic services utilize handles to designate cryptographic keys. For example, a request to the SPK 36 service to create an AES key returns a handle identifying the AES key. A subsequent encryption request would supply the handle as one parameter, designating the key to be used. A separate set of handles is associated with each virtual address space within an operating system domain.

IV. Secure Platform Global Services

An example embodiment of SPGS 38 of SPA 30 provides the following capabilities:
- protection domains;
- I/O support for the SPK;
- Secure I/O for domains including support for Legacy systems—virtualized I/O allowing multiple domains to potentially share I/O devices, support for hardware-based DMA restriction mechanisms, and support InfiniBand-like controllers;
- online replacement, addition, and deletion of I/O-related hardware infrastructure;
- support to allow operating system-specific loaders to load operating system domain images;
- domain kernel debugger support;
- SPGS debugger;
- platform machine check handling;
- EFI, PAL/SAL, and APCI runtime support (or emulation of) for domains;
- support for multiple SPGS binaries running in the same system; and
- support for multiple domains under control of a single SPGS.

V. Secure User Processes

In one embodiment, SP computer system 20 allows a non-secure application (running at PL3), such as an end user application 44, to execute a secure process that can keep secrets from root and also from PL2 code, including malicious code. As mentioned above, cryptographic keys are securely stored in PL0 memory, allowing data to be securely encrypted and decrypted. However, after data is decrypted, a problem of how to protect the decrypted data arises. For instance, after a user uses a secure key to decrypt sensitive information (e.g., a credit card number), the user needs a secure area to keep that data so that a root user or other user cannot see it.

Figure 6:
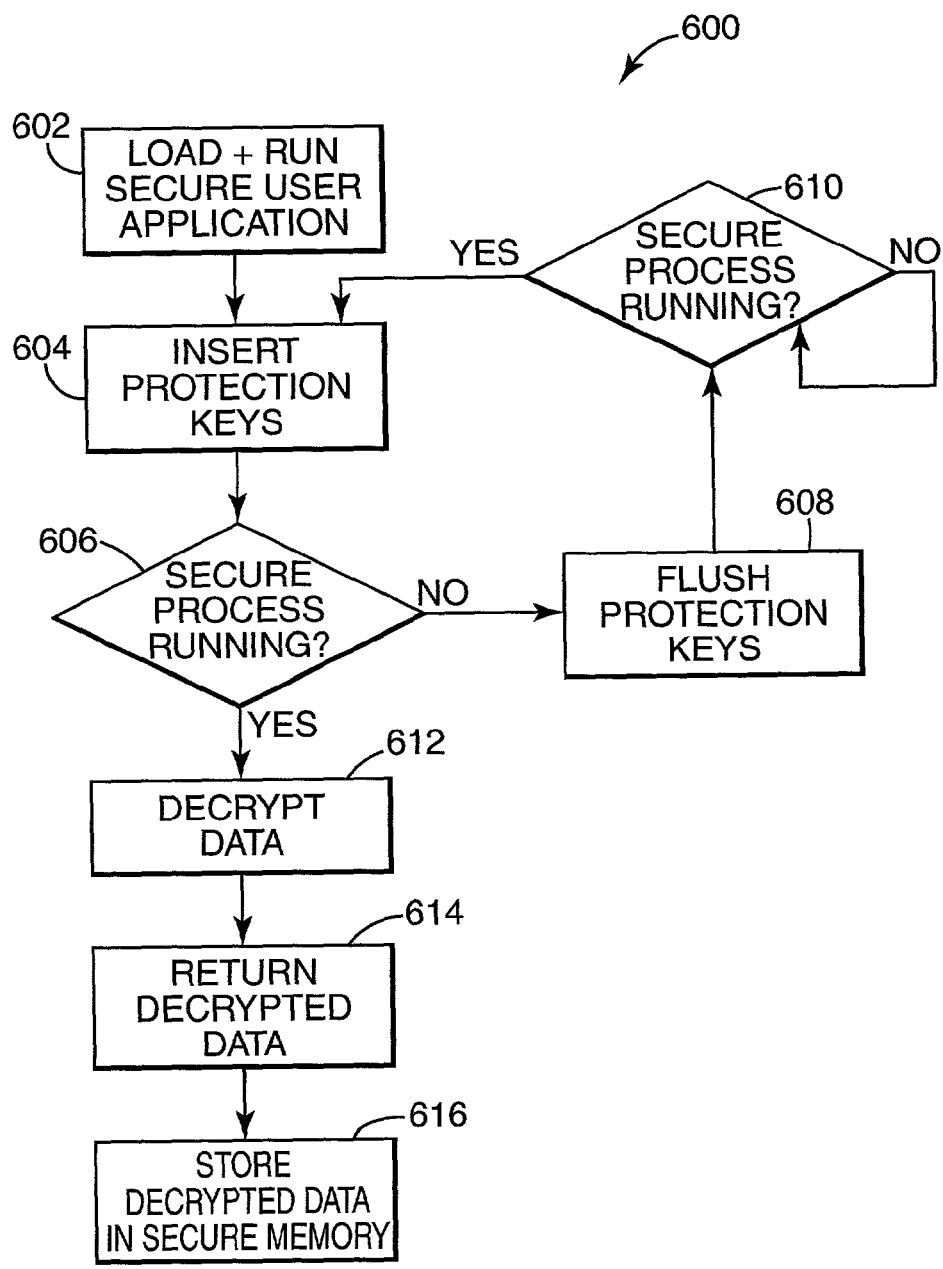
FIG. 6 is a flow diagram illustrating a process for allowing a user application to keep secrets from root and other users.

FIG. 6 is a flow diagram illustrating a process 600 for allowing a user application 44 to keep secrets from root and other users. It is assumed in process 600 that a secure login procedure has been provided to authenticate a user. A first step 602 in process 600 is to securely load and run a secure user application (at PL3). SPK 36 provides a PL0 service for dispatching such secure user level (PL3) tasks. In one embodiment, secure user processes are distinguished from non-secure user processes by setting a bit in the "magic number" or ELF (Executable and Linkable Format) header. A "magic number" is typically a two-byte code included in some files that provides information about the files, such as file type. An ELF header describes the layout of an executable (or "object") file, and contains information such as the start address of the code, the type of the code (e.g., 32-bit, 64-bit, little or big endian), and other information. In one form of the invention, a secure ELF loader is included among the PL0 services provided by SPK 36 for securely loading secure user applications. In one embodiment, the information for distinguishing between secure and non-secure user processes is contained in a secure memory page in memory 74 that cannot be modified by PL2 code. An effect of this secure storage is that the ptrace( ) system call is completely disallowed for this process, so that the simplest impersonation attacks can be prevented.

At step 604, when the secure user process runs, the user's personal protection keys are inserted in protection key registers 118 by SPK 36. A protection key is used to allow a user process (at PL3) to access a page of memory in memory 74 that nobody else can access, including root or anything running at PL2 or above. Since protection keys may only be inserted by PL0 code, root and other PL3 and PL2 code cannot subvert this protection.

A protection key protects a page so that nobody at any privilege level can access the page unless the key is inserted into one of the protection key registers 118. When the protection key is inserted into one of the protection key registers 118, the protected page can be accessed at any privilege level. Protection keys are independent of privilege level. Therefore, at step 606 and 608, when the secure user process is not running (step 606), either due to an interrupt, system call, or context switch, the user's personal protection keys are flushed from protection key registers 118 (step 608). SPK 36 intercepts all control flow changes that result in code outside of the secure user process being executed. The PL0 code of SPK 36 keeps track of the user's protection key or keys and inserts them whenever the user is executing code in the user's process, and flushes the protection keys at all other times. As shown in FIG. 6, the user's protection keys are flushed at step 608. And at step 610, as soon as execution of the secure user process continues, process 600 jumps back to step 604, where the user's protection keys are again inserted.

In one form of the invention, when a secure user process makes a system call (to go to PL2 code), the user's protection keys are flushed by a key trap process. The PL2 EPC page is protected so that when a system call occurs, a key trap is taken. The key trap process flushes the user's protection keys, and then the system call is executed. In one embodiment, a key trap is only taken for secure user processes, and not for non-secure user processes. Upon returning to execution of the user application, SPK 36 reinserts the user's protection keys in protection key registers 118.

At step 612, a user makes a call to a PL0 service provided by SPK 36 to decrypt a block of data using one of the user's secure cryptographic keys stored in PL0 memory. The PL0 service knows who the user is, because the user has already been authenticated. Data to prove the authentication is stored in the user's process context, which is contained in PL0 memory, as is the secure bit indicating that the user is running a secure process. At step 614, the PL0 service returns a block of decrypted data to the user. However, the returned data must be appropriately stored, or other users may gain access to it. In one embodiment, some secure memory is allocated by calling "secure_malloc( )," which is a PL0 service provided by SPK 36 that allocates memory pages that the user can read and write at PL3, but which are protected using a protection key that is unique to the user's process. After the memory is allocated, the user has a place to store decrypted but secret data, and nobody else at any privilege level can read this memory, since no access to the memory is allowed after SPK 36 removes the user's protection keys. The user can access the allocated memory whenever the user's protection keys are loaded in protection key registers 118. A root or other user cannot access clear text secrets in this user process address space. In step 616, the decrypted data is stored in the user's secure memory.

In order to prevent a root user from impersonating another user by writing into the user's code space, the user's code is also protected in one form of the invention. In one embodiment, a protection key is used to protect the user's code. In an alternative embodiment, the user's code is made read-only for everyone except the user. In one form of the invention, to prevent any security problems that might be caused by paging, paging is disabled for all secure user applications. In an alternative form of the invention, paging is implemented in PL0 code in SPK 36.

In one embodiment, the present invention allows a user process to access memory that the operating system cannot access. Thus, a secure process is created, which allows a user to keep secrets from the operating system. In one form of the invention, the secure process allows a user to keep secrets safe from other users, including the system administrator. One form of the invention provides a safe storage area for secret data that cannot be subverted by any code running above PL0. Using the memory management services of SPK 36, a user application is able to create secure memory partitions and processes to protect information in memory from all other applications and operating systems running on the system, even including the operating system under which it is running. Context switches are managed such that only when the secure process is running are the associated protection keys for the secure memory loaded.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling a computer system, the computer system including a memory and at least one processor having at least three execution privilege levels, the execution privilege levels including a first privilege level, a second privilege level that is less privileged than the first privilege level, and a third privilege level that is less privileged than the second privilege level, the at least one processor also having protection key registers configured to hold protection keys that are employed to control access to security critical structures, the method comprising:

operating a secure platform kernel (SPK) at the first privilege level as a privileged task;

operating an operating system at the second privilege level as an unprivileged task;

operating an end user application at the third privilege level as an unprivileged task;

allocating a portion of the memory for use by the end user application;

associating a first protection key value with the allocated memory portion;

inserting the first protection key value in one of the protection key registers only when instructions of the end user application are being executed, thereby allowing the end user application to access the allocated memory portion and preventing other tasks operating at the send and the third privilege levels from accessing the allocated memory portion.

2. The method of claim 1, and further comprising:

monitoring execution of instructions of the end user application; and flushing the first protection key value from the protection key registers when execution of the end user application instructions stops.

3. The method of claim 2, and further comprising:

reinserting the first protection key value in one of the protection key registers when execution of the end user application instructions resumes.

4. The method of claim 1, wherein the allocating a portion of the memory is performed by the SPK.

5. The method of claim 1, wherein the first protection key value is inserted in one of the protection key registers by the SPK.

6. The method of claim 1, and further comprising:

associating a second protection key with the end user application to prevent unauthorized modification.

* * * * *